(12) United States Patent
Hile

(10) Patent No.: US 11,202,415 B2
(45) Date of Patent: Dec. 21, 2021

(54) LAWN DEBRIS VACUUM MACHINE

(71) Applicant: Jeffrey B. Hile, Wexford, PA (US)

(72) Inventor: Jeffrey B. Hile, Wexford, PA (US)

( * ) Notice: Subject to any disclaimer, the term of this patent is extended or adjusted under 35 U.S.C. 154(b) by 465 days.

(21) Appl. No.: 16/149,227

(22) Filed: Oct. 2, 2018

(65) Prior Publication Data
US 2020/0100438 A1  Apr. 2, 2020

(51) Int. Cl.
*A01G 20/47* (2018.01)
*A47L 7/02* (2006.01)
*A47L 5/22* (2006.01)

(52) U.S. Cl.
CPC ............... *A01G 20/47* (2018.02); *A47L 5/22* (2013.01); *A47L 7/02* (2013.01)

(58) Field of Classification Search
CPC .............. A01G 20/47; A47L 5/22; A47L 7/02
See application file for complete search history.

(56) References Cited

U.S. PATENT DOCUMENTS

| | | | |
|---|---|---|---|
| 3,909,220 A * | 9/1975 | Ylinen | ................. E01H 1/0836 |
| | | | 55/296 |
| 5,102,056 A | 4/1992 | Ober | |
| 5,134,838 A | 8/1992 | Swisher et al. | |
| 5,692,262 A | 12/1997 | Haupt et al. | |
| 6,629,818 B2 | 10/2003 | Svoboda | |
| 8,602,334 B2 | 12/2013 | Svoboda et al. | |
| 2015/0139827 A1* | 5/2015 | Dwyer | ................... A01G 20/43 |
| | | | 417/319 |

* cited by examiner

*Primary Examiner* — Andrew A Horton
(74) *Attorney, Agent, or Firm* — Carothers and Carothers

(57) ABSTRACT

A lawn debris vacuum machine having a mobile housing with an inlet chute and a discharge chute, and a motor mounted on the housing that is connected for rotatably driving a vacuum impeller disposed in the housing between the inlet chute and the discharge chute. A thrasher protrudes into the inlet chute and is rotatably driven from the motor to break up debris in the inlet chute which would otherwise be sufficiently large enough to block the inlet chute. A rotating brush is mounted to the housing at the opening of the inlet chute for brushing debris into the inlet chute. The brush is rotatably driven in a direction opposite to the forward direction of the machine's progress.

13 Claims, 4 Drawing Sheets

LAWN DEBRIS VACUUM MACHINE

BACKGROUND

This invention relates to an apparatus for collection and reduction of yard debris.

Home owners, commercial property owners and companies who provide care for lawns have an ongoing challenge to remove leaves, grass clippings and other debris, such as sticks and beverage containers, from lawns, gardens and paved surfaces. Many existing machines depend upon rotating brushes and airflow to lift and entrain the leaves and other debris through a chipper shredder device and then to blow the reduced debris into accumulation units. However, the existing machines do not adequately remove all of the debris and they commonly become plugged at their inlet chute with larger debris, such as sticks and beverage containers that become jammed in the inlet chute.

It is an object of the present invention to provide a machine which effectively and efficiently removes leaves and other debris and simultaneously prevents clogging of the inlet chute.

SUMMARY OF THE INVENTION

The lawn debris vacuum machine of the present invention is provided with a mobile housing having an inlet chute and a discharge chute with a motor mounted on the housing and connected for rotatably driving a vacuum impeller that is disposed in the housing between the inlet chute and the discharge chute. The improvement includes a thrasher protruding into the inlet chute that is rotatably driven from the motor to break up the debris in the inlet chute which is sufficiently large enough to block the inlet chute. The vacuum impeller and the thrasher are rotatably driven from the motor drive shaft.

The thrasher, in a preferable embodiment is in the form of a bar, wherein the bar is mounted transversely to the drive shaft that is axially driven by the motor. The bar may be mounted to the drive shaft intermediate opposite ends of the thrasher bar, and in one embodiment opposite end portions of the thrasher bar extend from the drive shaft in opposite directions. In this configuration the opposite end portions of the thrasher bar may extend from the drive shaft at different angles. This configuration ensures breakup impact of the thrasher bar with incoming debris in the inlet chute that might otherwise clog the chute.

The thrasher is rotatably driven in the preferred embodiment from the vacuum impeller. The lawn debris vacuum machine also preferably includes a rotating brush mounted to the housing at an opening of the inlet chute for brushing debris into the chute. This brush is driven from the motor to rotate in a direction opposite to the forward direction of the lawn vacuum machine, thereby providing a clean sweep of the surface to be cleaned. The vacuum impeller is also preferably provided with an annular array of impeller vanes with exposed distal edges, wherein the distal edges are provided with a series of teeth for shredding incoming debris. For extra shredding and reduction of the debris, a stationary shredder plate may also be provided in the discharge chute for further shredding debris as it passes into a collection device.

The lawn debris vacuum machine of the present invention, may, as an alternative, be provided in a form wherein the housing consists of two separable and connectable housing parts, namely a motor housing containing the motor and the drive wheels, and the vacuum housing containing the vacuum impeller, the inlet and discharge chutes, and the thrasher. In this configuration the separate motor housing may be connected to devices other than a vacuum housing of the present invention, such as a snow blower housing unit, or a lawn or weed mowing unit.

BRIEF DESCRIPTION OF THE DRAWINGS

Other objects and advantages appear hereinafter in the following description and claims. The accompanying drawings show, for the purpose of exemplification, without limiting the scope of the present invention or the appended claims, certain practical embodiments of the present invention wherein:

DETAILED DESCRIPTION OF THE DRAWINGS

Figure 1:
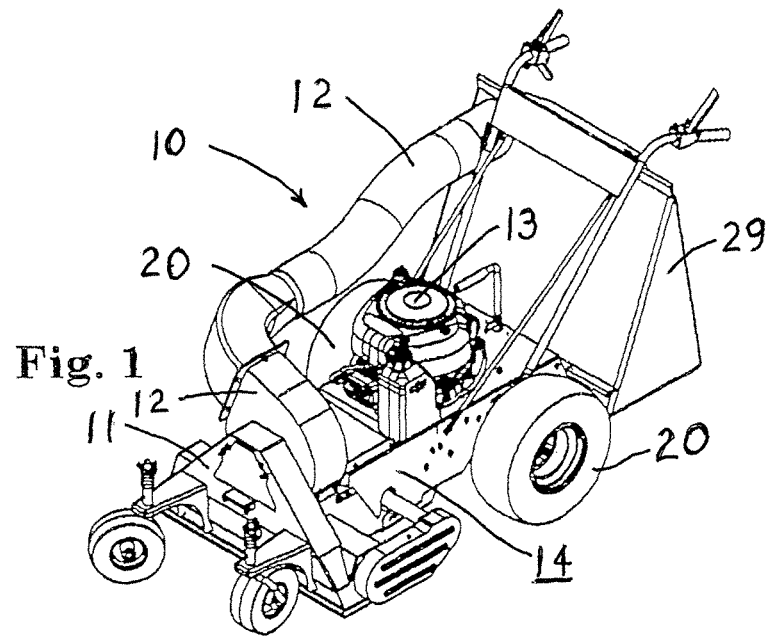
FIG. 1 is a perspective view of the lawn debris vacuum machine of the present invention.
Figure 2:
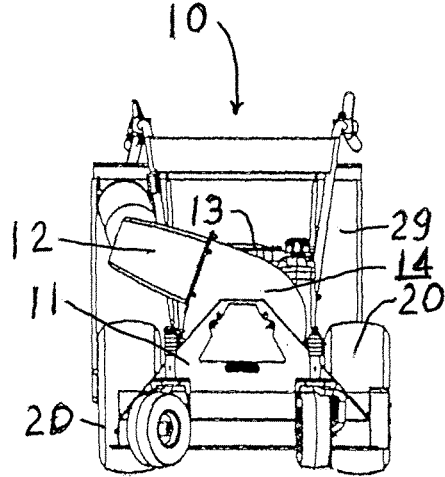
FIG. 2 is a front view of the lawn debris vacuum machine shown in FIG. 1.
Figure 3:
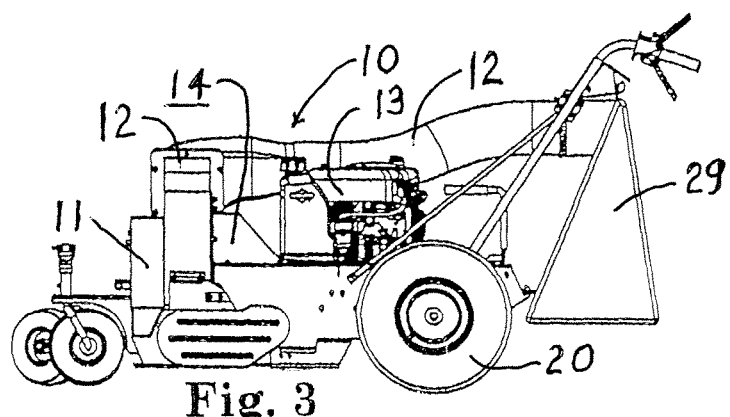
FIG. 3 is a left side view of the lawn debris vacuum machine shown in FIG. 1.
Figure 4:
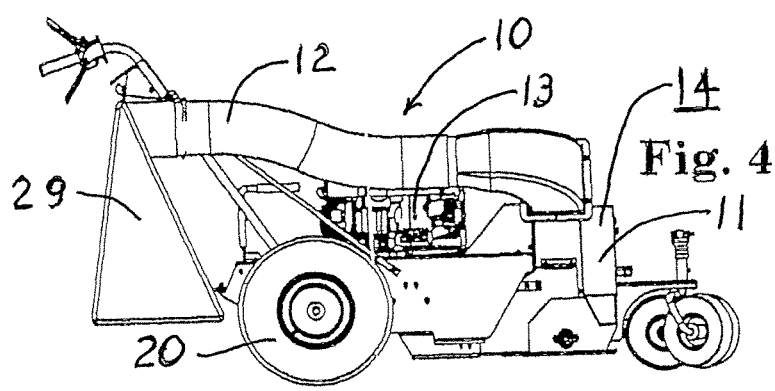
FIG. 4 is a right side view of the lawn debris vacuum machine shown in FIG. 1.

Referring to FIGS. 1 through 7 of the drawings, the lawn debris vacuum machine 10 of the present invention is a motor driven machine with an inlet chute 11 and a discharge chute 12 with a motor 13 mounted on housing 14. Motor 13 is gasoline driven, but may be an electric motor, which is connected to and rotatably drives vacuum impeller 15 disposed in housing 14 between inlet chute 11 and discharge chute 12. A thrasher 16 protrudes into inlet chute 11 and is rotatably driven from motor 13 to break up debris driven into inlet chute 11 which is sufficiently large enough to otherwise block inlet chute 11. Such debris that might block inlet chute 11 may consist of articles, such as sticks or beverage containers, such as beverage cans.

Figure 5:
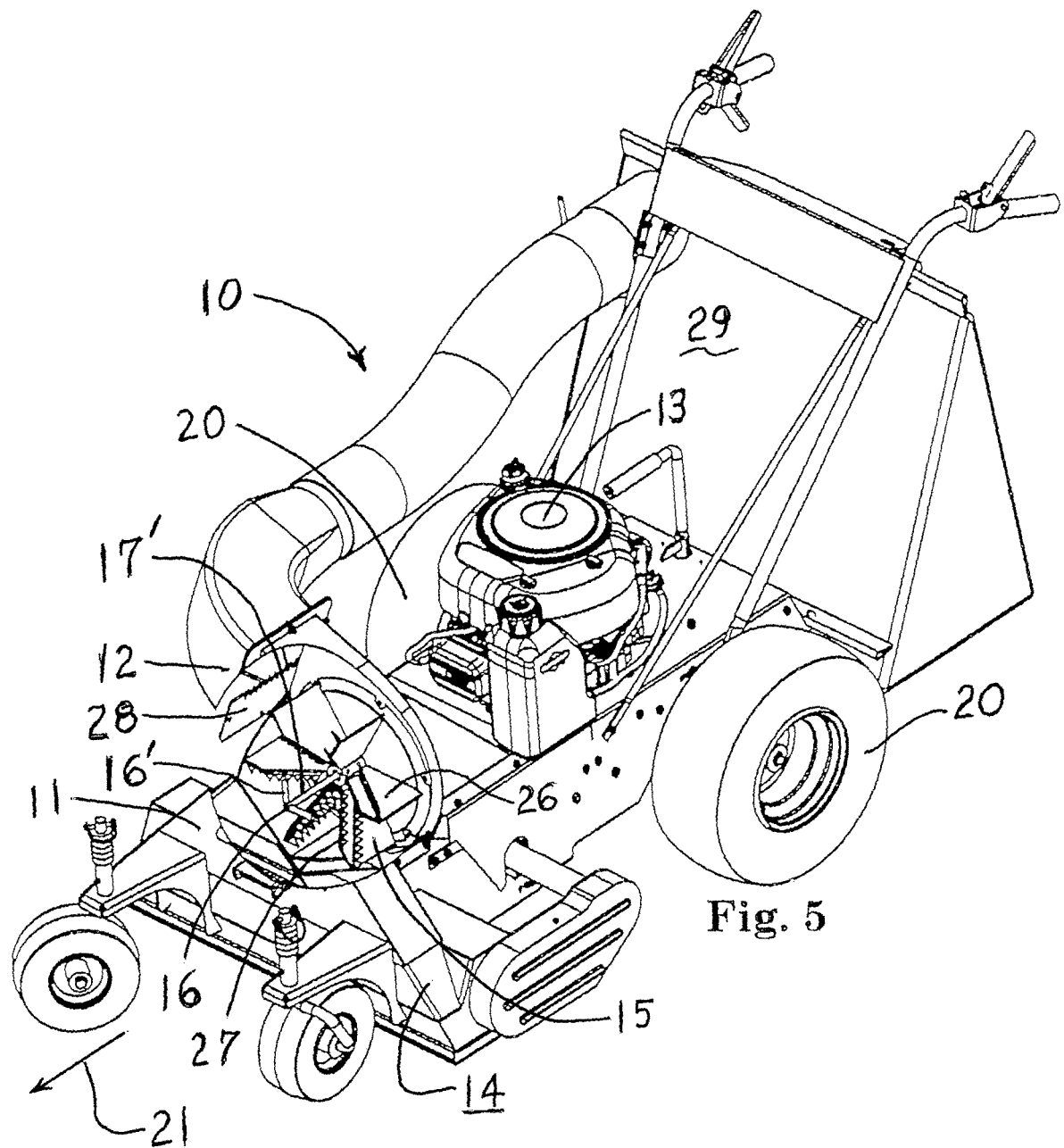
FIG. 5 is an enlarged perspective view of the lawn debris vacuum machine shown in FIG. 1 with a broken-out section of the housing showing the impeller and thrashing bar.
Figure 6:
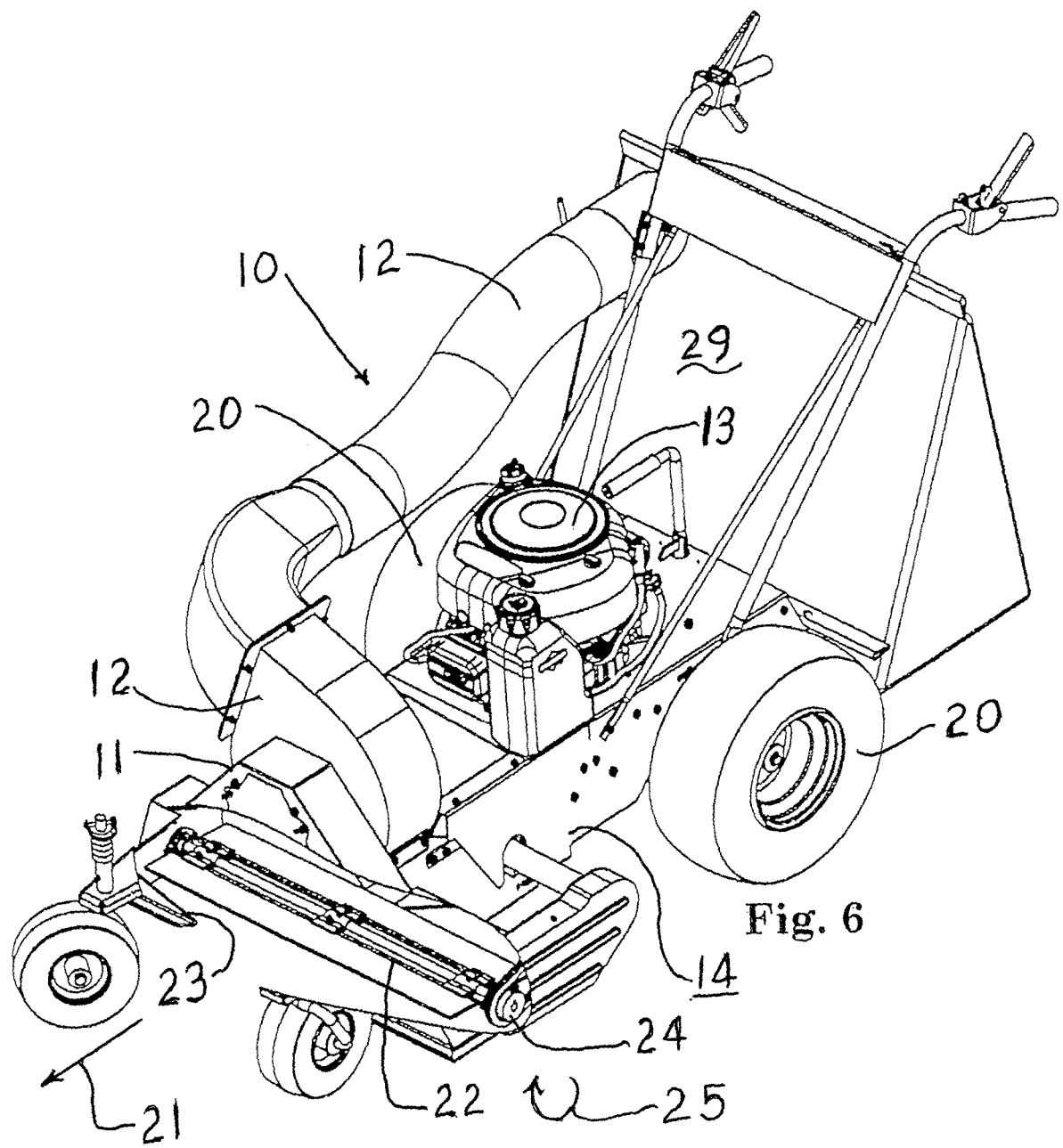
FIG. 6 is an enlarged perspective view of the lawn debris vacuum machine shown in FIG. 1 with a broken-out section of the housing showing the brushes.
Figure 7:
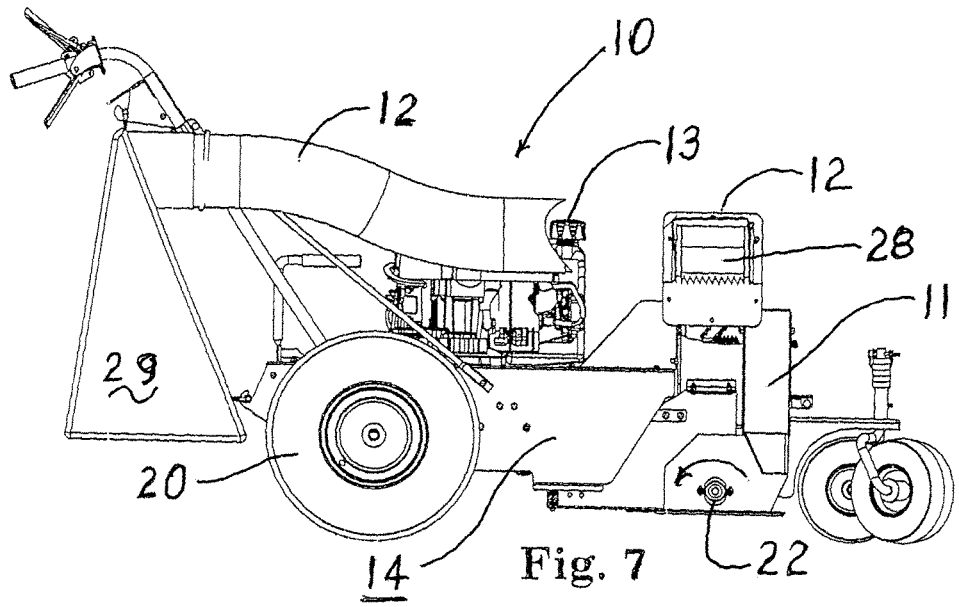
FIG. 7 is a right side view of the lawn debris vacuum machine shown in FIG. 1 with a broken-out section of the housing showing the stationary shredder plate mounted in the discharge chute.

In the embodiment illustrated, vacuum impeller 15 and thrasher 16 are rotatably driven from the drive shaft 17 (FIG. 8) of motor 13. Thrasher 16 as illustrated in FIG. 5 is in the configuration of a bar which is mounted transversely to the drive shaft 17' that is axially driven by motor 13. In fact, the thrasher bar 16, as shown in the embodiment of FIG. 5, is rotatably driven directly from the vacuum impeller 15 via the continuing motor drive shaft 17'.

In FIG. 5, the thrasher 16 is shown in the form of a bar that is mounted to the drive shaft 17' intermediate opposite ends of the thrasher bar 16'. In addition, it will be noted that opposite end portions of the thrasher bar 16' extend from the drive shaft 17' in opposite directions. In addition, opposite end portions of the thrasher bar 16' extend from drive shaft 17' in opposite directions but at different angles. This configuration insures thorough breakup of incoming debris which might otherwise be caught and stuck in inlet chute 11.

Motor 13 is also connected to drive wheels 20 of the lawn debris vacuum machine 10 to drive it in a forward direction as indicated by arrow 21. As further illustrated in FIG. 6, a rotating brush 22 is mounted to the housing 14 at the opening 23 of inlet chute 11 for brushing debris into inlet chute 11. Brush 22 is connectably driven from motor 13 through a pulley and belt drive system 24 to rotate brush 22 in a direction opposite to the forward direction 21, or in a clockwise direction as indicated by arrow 25. This insures a clean sweep of the lawn or pavement surface that is being vacuumed, and insures that all the debris will be brushed up and directed up into the inlet chute 11.

Referring again to FIG. 5, vacuum impeller 15 is provided with an annular array of impeller vanes 26 with exposed distal edges 27 that are provided with a series of teeth for shredding debris. In addition, a stationary shredder plate 28 (see FIGS. 5 and 7) that protrudes into the discharge chute 12 and is provided with a toothed edge for shredding debris that passes over shredder plate 28 and on through discharge chute 12 and into the collection receptacle 29 that hangs from the rear of machine 10 for collection of the lawn debris. Periodically receptacle 29 may be emptied in a conventional manner.

Figure 8:
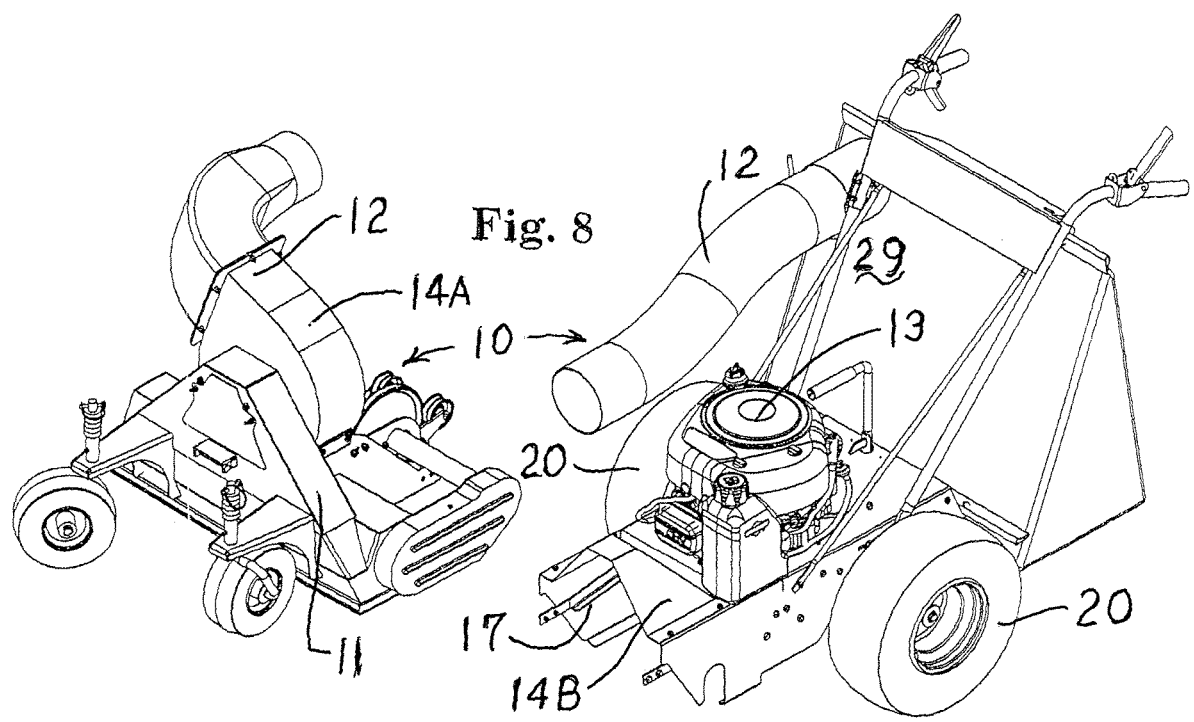
FIG. 8 is a perspective view of the lawn debris vacuum machine of the present invention illustrating the housing of the machine consisting of two separable and connectable housing parts whereby the housing containing the vacuum impeller, the inlet and discharge chutes and the thrasher may be substituted with other lawn care implements, such as a snow blower housing or a lawn cutting housing, which may be attached to and driven by the motor housing.

Referring next to FIG. 8, the lawn debris vacuum machine 10 of the present invention is shown with housing 14 provided into two separable and connectable housing parts 14A and 14B wherein housing 14B contains the motor and drive mechanisms and housing part 14A contains the vacuum impeller 15, inlet and discharge chutes 11 and 12 and thrasher 16. This embodiment illustrates that the motor housing part 14B may be connected to other lawn care implements other than the vacuum machine of the present invention and may thereby be utilized to drive other lawn care implements, such as snow blowers and lawn and weed cutting implements having a rotating cutting blade or a rotating string cutter.

I claim:

1. A lawn debris vacuum machine having a mobile housing with an inlet chute having a passageway of continually deceasing cross sectional area and a discharge chute and a motor mounted on said housing and connected for rotatably driving a vacuum impeller disposed in said housing between said inlet chute and said discharge chute;

the improvement comprising a thrasher protruding into said inlet chute passageway and rotatably driven from said motor to break up debris in said inlet chute which is sufficiently large enough to block said inlet chute.

2. The lawn debris vacuum machine of claim 1, wherein said vacuum impeller and said thrasher are rotatably driven from a drive shaft for said motor.

3. The lawn debris vacuum machine of claim 1, wherein said thrasher is a bar.

4. The lawn debris vacuum machine of claim 3, wherein said bar is mounted transversely to a drive shaft axially driven by said motor.

5. The lawn debris vacuum machine of claim 4, wherein said bar is mounted to said drive shaft intermediate opposite ends of said bar.

6. The lawn debris vacuum machine of claim 5, wherein opposite end portions of said bar extend from said drive shaft in opposite directions.

7. The lawn debris vacuum machine of claim 6, wherein said opposite end portions of said bar extend from said drive shaft at different angles.

8. The lawn debris vacuum machine of claim 1, wherein said thrasher is rotatably driven from said vacuum impeller.

9. The lawn debris vacuum machine of claim 1, including a rotating brush mounted to said housing at an opening of said inlet chute for brushing debris into said inlet chute.

10. The lawn vacuum machine of claim 9, wherein said motor is also connected to at least one drive wheel supporting said housing for driving said housing in a forward direction, said brush connectively driven from said motor to rotate in a direction opposite to said forward direction.

11. The lawn debris vacuum machine of claim 1, wherein said vacuum impeller has an annular array of impeller vanes with exposed distal edges, said distal edges having a series of teeth for shredding debris.

12. The lawn debris vacuum machine of claim 1, including a stationary shredder plate protruding into said discharge chute for shredding debris.

13. The lawn debris vacuum machine of claim 1, wherein said housing consists of two separable and connectable housing parts, namely a motor housing containing said motor and vacuum housing containing said vacuum impeller and said inlet and discharge chutes and said thrasher.

* * * * *